Oct. 19, 1943.  W. E. WINE  2,332,037
DEMOUNTABLE TRACTION UNIT FOR TRACTOR WHEELS
Filed March 28, 1942  4 Sheets-Sheet 1
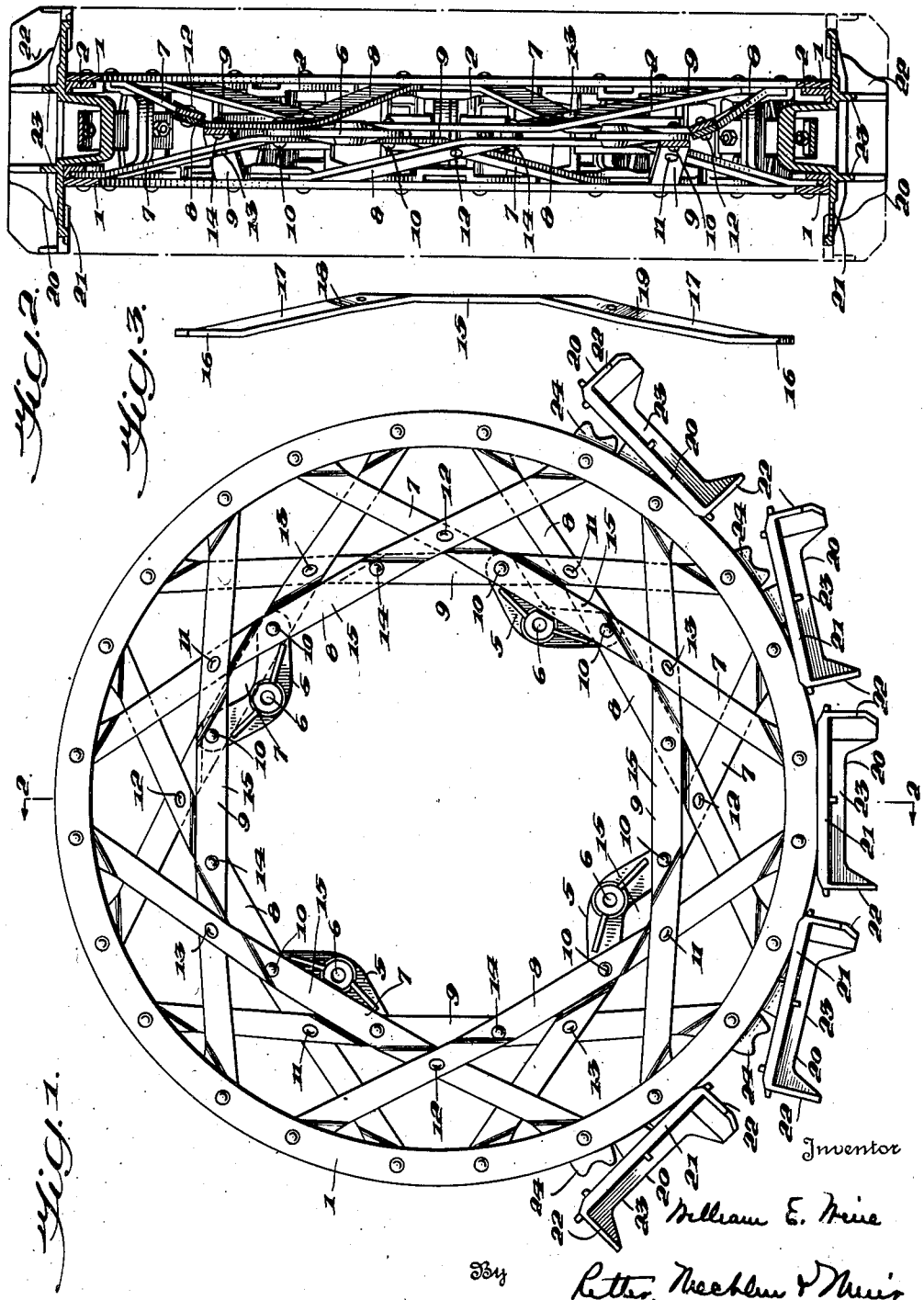

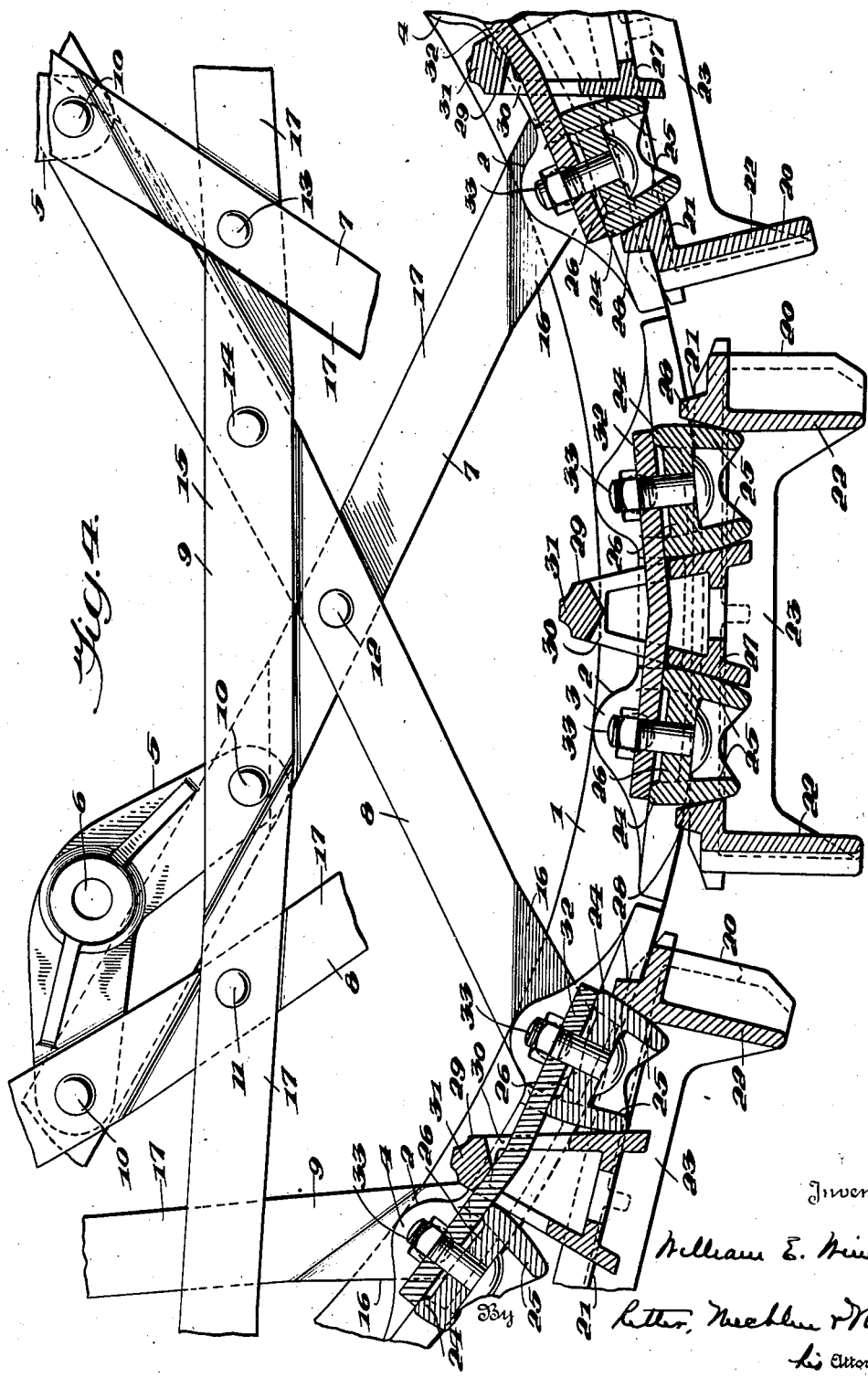

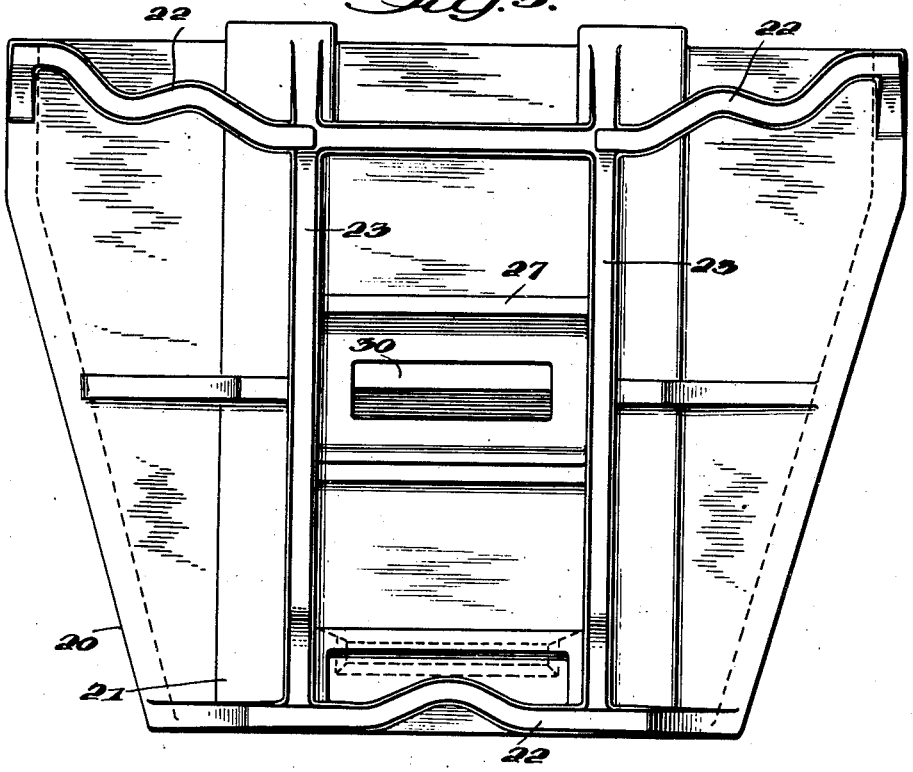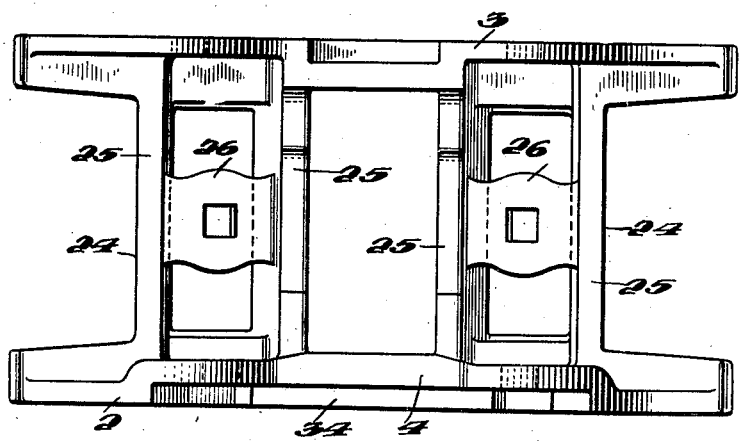

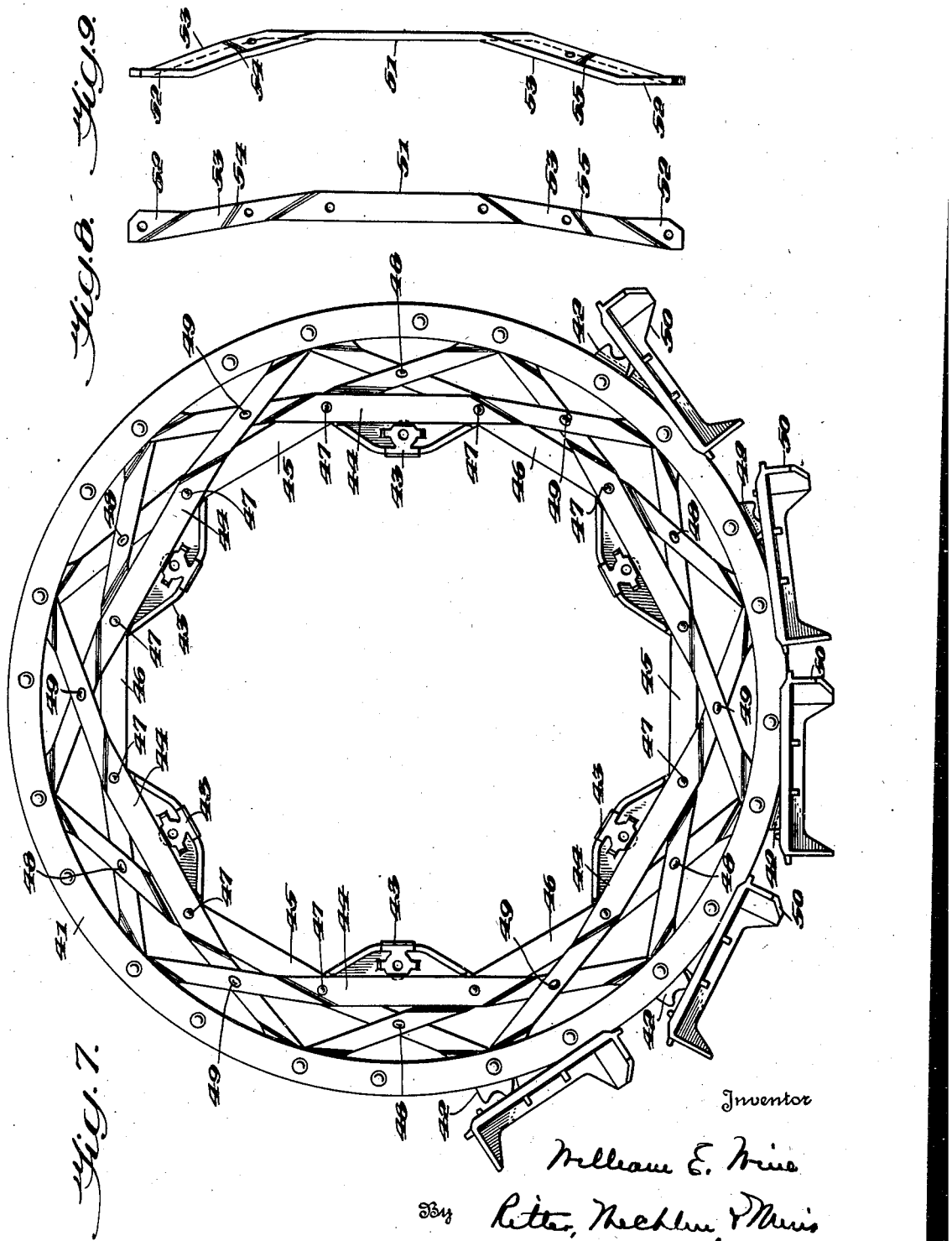

Patented Oct. 19, 1943

2,332,037

UNITED STATES PATENT OFFICE 2,332,037

DEMOUNTABLE TRACTION UNIT FOR TRACTOR WHEELS

William E. Wine, Toledo, Ohio

Application March 28, 1942, Serial No. 436,683

8 Claims. (Cl. 301—54)

My invention relates to tractor wheels and more particularly to a demountable annular traction unit which is adapted to form the peripheral portion of a tractor wheel.

The principal object of the invention is to provide a demountable annular traction unit for tractor wheels which may be easily and quickly substituted for the demountable rubber tire with which tractor wheels are customarily provided.

A primary feature of the invention consists in providing the annular traction unit with a plurality of brackets spaced inwardly from a pair of substantially parallel rim elements, the brackets being adapted to receive means for connecting the traction unit to the tractor wheel and being connected to the rim elements by a plurality of members which are rigidly connected together in overlapping relation independently of the brackets.

Another feature of the invention consists in providing the traction unit with means spaced inwardly from the rim elements to receive devices for connecting the unit to a tractor wheel and with members rigidly secured to each of the rim elements for connecting the means to said elements, each of the members being secured in overlapping relation to others of said members which are respectively connected to each of the rim elements.

A further feature of the invention consists in connecting each of the brackets which are adapted to receive means to attach the traction unit to the tractor wheel to the rim elements by a set of members, the members of each set being secured together in overlapping relation and at least one member of each set being secured in overlapping relation with a member of an adjacent set.

A still further feature of the invention consists in connecting the brackets or means, by which the traction unit is connected to the tractor wheel, to the rim elements of the unit by a plurality of elongated members, each of the members having its extremities secured to one of the rim elements and each being secured in overlapping relation to another of the members secured to the same rim element and to another of the members secured to the other rim element.

A still further feature of the invention consists in rigidly connecting the rim elements of the traction unit by a plurality of spacer members each of which is provided with teeth forming a segment of a gear, a shoe being movably associated with each of the spacer members and having gear teeth providing a rack with which the teeth of the associated gear segment are adapted to have gear contact to propel the wheel with respect to the shoes while the latter are in contact with the ground.

Other and more specific features of the invention, residing in advantageous forms, combinations and relations of parts, will hereinafter appear and be pointed out in the claims.

In the drawings,

Figure 1 is a side elevational view illustrating one form of the traction unit, many of the shoes with which the unit is provided being omitted for clarity.

Figure 2 is a vertical transverse sectional view of the traction unit taken on line 2—2 of Figure 1, all but the shoes at the very top and bottom of the unit being omitted.

Figure 3 is a detail side elevational view of one of the elongated members of the traction unit shown in Figure 1.

Figure 4 is an enlarged longitudinal sectional view of a portion of the traction unit illustrated in Figure 1.

Figure 5 is an under side view of one of the shoes of the traction unit.

Figure 6 is a plan view of one of the spacer members which connect the rim elements of the traction unit.

Figure 7 is a side elevational view illustrating another form of the traction unit.

Figure 8 is a side elevational view of one of the elongated members of the traction unit of Figure 7.

Figure 9 is a view of the connecting member shown in Figure 8 as viewed from the right hand edge thereof.

Referring more in detail to the drawings and particularly to the traction unit illustrated in Figures 1 to 6, inclusive, I indicates a pair of laterally spaced substantially parallel rim elements. For convenience of reference, the rim element which is nearest the eye is termed the near rim element, while the other one is termed the far rim element. In Figure 2, the so-called near rim element is on the left side of the figure, while the so-called far rim element is on the right side of the figure.

Interposed between the rim elements at suitable intervals are a plurality of spacers 2 which, by reason of being riveted or otherwise secured to the rims, serve to rigidly connect them in spaced relation. Each of the spacers has upright walls 3 and 4, respectively, which are arranged in overlapping relation to the inner faces of the rim elements and are secured thereto. The lower edges of the side walls are of substantial width and each is formed in the arc of a circle so as to coincide with the curvature of the outer edges of the rims. Spaced inwardly from the rim elements and preferably located intermediate the planes in which the latter are disposed is means for receiving bolts or the like (not shown) with which tractor wheels are customarily provided for securing demountable rubber tires thereon. In the present embodiment of the invention this means consists of a plurality of brackets 5 respectively having apertures 6 for receiving the bolts by which the unit may be secured to the tractor wheel. The brackets are located so that the radial distance between the apertures thereof and the periphery of the rim elements is substantially identical with the radial distance between corresponding parts of the demountable rubber tire for which the traction unit is to be substituted, that is, the radial distance between the apertures in the lugs or the like carried by the demountable rim and the outer periphery of the tire. The particular unit shown in Figure 1 is well adapted for use in connection with tractor wheels having demountable tire securing bolts located, for example, ten inches from the center of the wheel and where the outside diameter of the traction unit is about thirty-eight inches.

Each bracket 5 is connected to the rim elements by a plurality of sets of elongated members. These members are preferably of plate form and the extremities of each are secured to one or to the other of the rim elements. In the form of the invention illustrated in Figure 1, three plate-like members 7, 8 and 9, respectively, are employed for connecting each bracket to the rim elements, members 7 overlapping one face of the bracket and being secured thereto at each end by rivets 10 and members 8 and 9 overlapping the opposite face of the bracket and being respectively secured to but one end thereof by the same rivets 10. Member 7 of each set of the elongated members is connected at both extremities to one rim element while members 8 and 9 of each set are connected at their extremities to the other rim element.

As the brackets 5 are comparatively thin with respect to the distance between the rim elements, the elongated connecting members must be offset intermediate their ends to be secured to the brackets and, in order that the members secured to one rim element may be identical with the elongated members secured to the other rim element, brackets 5 are preferably disposed midway between the planes of the rim elements.

So that the traction unit will be amply strong, the elongated members of each set are not only rigidly secured to its associated bracket but members 8 and 9 of each set are overlappingly secured together by rivets 11 intermediate each bracket and the rim elements, and most of the members of each set are also overlappingly secured to adjacent members of adjoining sets. Thus member 7 of each set is preferably secured in overlapping relation by rivet 12 to member 8 of one adjoining set of members and it is also preferably secured in overlapping relation by rivet 13 to member 9 of the other adjoining set of members. Moreover, members 8 and 9 of each adjoining set may be advantageously secured in overlapping relation by rivets 14.

The central portion 15 of each of the plate-like members to which the brackets 5 are secured is arranged in a plane substantially parallel with the end portions 16 of the member which are connected to the rim elements 1 and the portions 17 of the plate members intermediate the central and end portions 15 and 16, respectively, incline in opposite directions. In order that these two inclined portions of each member may overlap corresponding portions of adjacent members without fouling, one inclined portion is bent outwardly, as indicated at 18, and the other is bent inwardly as indicated at 19. The portions of the plate members which are overlappingly secured together may be easily formed so as to be disposed in contiguous substantially parallel planes by merely bending each member on lines disposed at angles to each other instead of by twisting the member. The end portion 16 of the elongated members are preferably connected to the rim elements by the same rivets which are employed to connect the spacers 2 thereto and, in order that they may be interposed between the rim elements and the spacers, one wall of the latter is offset inwardly as indicated at 34. Removably associated with the spacers 2 are shoes 20 which form a track on which the tractor wheel is adapted to roll. Each shoe has a plate-like base portion 21 and downwardly extending transverse ground engaging flanges 22 which may be connected and suitably reinforced by longitudinally extending ribs 23. The shoe is preferably wider at one end than at the other and the ground engaging flange at the narrow end of the shoe is of corrugated form intermediate the longitudinal ribs 23 and the transverse ground engaging flange at the wide end of the shoe is of corrugated form outwardly of the longitudinal ribs. By forming the flanges in this fashion, I have found that the base portion of the shoe is not so apt to warp to such an extent, upon cooling of the casting, as to render the shoe unfit for use.

The upper face of the base portion 21 of the shoe affords a surface along which the adjacent peripheral edge portions of the traction unit (formed in part by the rim elements 1 and the spacers 2) are adapted to roll when the shoe engages the ground and functions to support the wheels.

Each shoe is so loosely mounted that, when it engages the ground, the traction unit or wheel moves relatively to it. In other words, the shoe upon engaging the ground becomes stationary while the wheel continues to move. It is thus necessary that the spacers have some interlocking connection with the shoes in order that the driving force of the wheel may be transmitted through the shoe to the ground. Heretofore various means have been proposed for interlocking the shoes and spacers or other corresponding elements of the traction wheels but in the main they have been crude and unsatisfactory, the structures being such as to be subjected to excessive friction and wear.

I have found that eminently satisfactory results can be obtained by providing each spacer member with transverse teeth 24 to form a gear segment and by forming each shoe with gear teeth to provide a rack with which the teeth of the spacer are adapted to mesh. The pitch circle of the gear teeth on the spacer preferably has the same diameter as the diameter of the outer edges of the rim elements 1 and the face portions as well as the flank portions of each of the teeth is adapted to cooperate with the teeth on the shoe.

Each spacer tooth may be conveniently formed by two laterally spaced members 25 which are connected intermediate their ends by a web portion 26. The outer faces of the members 25 are formed so that the tooth will have the desired profile.

Each shoe is preferably formed with three teeth, a central one 27 and end ones 28. The profiles of these teeth are such as to work with the teeth on the spacers with a minimum of slipping or sliding between the teeth, the teeth principally coacting by rocking upon each other. The central tooth 27 of each shoe is formed with an extension 29 having end walls 30 which are connected at their upper ends by a cross bar 31. This extension is adapted to receive a shoe retaining plate 32 which bridges the space between the two teeth 24 of the spacer and is rigidly secured as by bolts 33 to the web portions 26 of the teeth. The opening in the extension 29 of the central tooth through which the plate 32 passes is of sufficient size and the shape of the extension itself is such that the shoe may angle sufficiently with respect to the rim to enable the base portion of the shoe to assume a position substantially parallel with the surface over which the wheel is to pass at the time the weight of the wheel and the load it carries is transmitted to the shoe. And likewise the construction is such that the base of each shoe will remain substantially parallel with the ground until the weight of the wheel and the load it carries is transferred to the next succeeding shoe.

The traction unit illustrated in Figures 7, 8 and 9 is quite similar to that shown in the other figures of the drawings. It has been primarily designed for use with tractor wheels which have bolts for securing demountable rubber tires thereto which are disposed approximately sixteen inches from the center of the wheel, the outside diameter of the unit being approximately forty-eight inches. This unit includes rim elements 40 41 rigidly connected in spaced relation by spacers 42, brackets 43 for receiving means by which the unit may be removably secured to a tractor wheel and a plurality of elongated, preferably plate-like, members 44, 45 and 46, respectively, for connecting each bracket 43 to the rim elements 41.

Member 44 of each set of members is overlappingly secured to one face of the bracket at each end thereof by rivets 47 and members 45 and 46 which overlap the opposite face of the bracket are respectively secured to but one end thereof by the same rivets 47. Member 44 of each set of elongated members is connected at both extremities to one rim element while members 45 and 46 of each set are connected at their extremities to the other rim element.

In addition to the members of each set being rigidly connected to its associated bracket, members 45 and 46 of each set are overlappingly secured by a rivet 48 at a point intermediate the bracket and the rim elements and members 44 of each adjoining set are overlappingly secured together by rivets 49. It is to be noted that the adjacent ends of adjoining brackets 43 are alternately connected by members 45 and 46, respectively, and that, whereas the elongated members are connected to both the far and near rim at each shoe in the construction shown in Figures 7, 8 and 9, the elongated members of the unit shown in the other figures of the drawings are connected to only one or the other of the rims at each shoe. Moreover, although the member 44 of every set of members in the unit shown in Figure 7 is secured to the near rim and members 45 and 46 are secured to the far rim, the elongated members of the unit shown in Figure 1 do not follow the same pattern. In that latter unit, the elongated member 7 for one bracket is secured to the near rim while for the two adjoining brackets it is secured to the far rim and the other members of each set of members correspondingly vary.

The spacers 42 of the unit shown in Figures 7, 8 and 9 are of the same construction as the spacers of the units shown in the other figures and the shoes 50 of the unit of Figure 7 are also of the same construction as the shoes 20. Moreover, as may be seen from Figures 8 and 9, the elongated plate-like members of the traction unit shown in Figure 7 are of substantially the same construction as the corresponding members of the traction unit of Figure 1. Each has a central portion 51 for attachment to the brackets 43 and substantially parallel end portions 52 for attachment to the rim elements 41 and the spacers 42. The portions 51 and 52 are connected by relatively inclined portions 53, one of which is offset slightly outward as indicated at 54 and the other of which is offset slightly inward as indicated at 55 so that the inclined portions of adjacent members may be overlappingly secured without fouling.

From the foregoing, it will be perceived that a simple and rugged annular unit has been devised which is capable of forming the peripheral portion of a tractor wheel and which may be easily and quickly substituted for the conventional demountable rubber tire with which tractor wheels are customarily provided. It is evident that many detail changes and alterations may be made in the two exemplifications of the invention which have been illustrated and described without departing from the spirit and scope of the appended claims.

What I claim is:

1. A demountable annular traction unit adapted to form the peripheral portion of a tractor wheel and to be used in place of a demountable rubber tire, said unit comprising laterally spaced substantially parallel rim elements, brackets spaced inwardly from the rim elements having apertures adapted to receive devices for connecting the traction unit to the tractor wheel, and a plurality of plate-like members rigidly secured to each of the rim elements for connecting said brackets to said elements, each of said members being secured in overlapping relation to two others of said members which are each connected to different ones of said rim elements and each of said brackets being arranged so that the aperture thereof is disposed inwardly of adjacent portions of each of the members connecting the bracket to the rims.

2. A demountable annular traction unit adapted to form the peripheral portion of a tractor wheel and to be used in place of a demountable rubber tire, said unit comprising laterally spaced substantially parallel rim elements, a plurality of brackets spaced inwardly from said rim elements adapted to receive means for connecting the traction unit to the tractor wheel, and a plurality of members connecting each of said brackets to the rim elements, one of said members for each of said brackets being connected at both ends to one of the rim elements and two others of said members for each bracket being connected at both their ends to the other rim element.

3. A demountable annular traction unit adapted to form the peripheral portion of a tractor wheel and to be used in place of a demountable rubber tire, said unit comprising laterally spaced substantially parallel rim elements, a plurality of brackets spaced inwardly from said rim elements adapted to receive means for connecting the traction unit to the tractor wheel, a set of members rigidly connecting each of said brackets to the rim elements, the members of each set being secured together in overlapping relation and at least one member of each set being secured in overlapping relation to one of the members of an adjacent set at a point spaced from and intermediate of adjoining brackets.

4. A demountable annular traction unit adapted to form the peripheral portion of a tractor wheel and to be used in place of a demountable rubber tire, said unit comprising laterally spaced substantially parallel rim elements, means spaced inwardly from the rim elements to receive devices for connecting the traction unit to the tractor wheel, and a plurality of elongated members connecting said means to each of said rim elements, each of said members having both of its extremities secured to one or the other of said rim elements and each being secured in overlapping relation to others of said members which are respectively secured to each rim element, the members secured to at least one of the rim elements being offset intermediate their ends for attachment to the members secured to the other rim element.

5. A demountable annular traction unit adapted to form the peripheral portion of a tractor wheel and to be used in place of a demountable rubber tire, said unit comprising laterally spaced substantially parallel rim elements, means spaced inwardly from the rim elements to receive devices for connecting the traction unit to the tractor wheel, and a plurality of elongated members connecting said means to each of said rim elements, some of said members having their extremities secured to one of said rim elements and others of said members having their extremities secured to the other rim element, the said members connected to one rim element being overlappingly secured adjacent said means to the members connected to the other rim element and adjacent ones of said members which are connected to the same rim element being overlappingly secured together at points intermediate said means and the rim elements.

6. A demountable annular traction unit adapted to form the peripheral portion of a tractor wheel and to be used in place of a demountable rubber tire, said unit comprising laterally spaced substantially parallel rim elements, means spaced inwardly from the rim elements and disposed intermediate the planes of the latter for receiving devices to connect the traction unit to the tractor wheel, and a plurality of members connecting said means to said rim elements, some of said members having their extremities secured to one of said rim elements and the others of said members having their extremities secured to the other rim element, the said members which are connected to the same rim elements being secured in overlapping relation to each other and the said members which are connected to different rim elements being likewise secured together in overlapping relation.

7. A demountable annular traction unit adapted to form the peripheral portion of a tractor wheel and to be used in place of a demountable rubber tire, said unit comprising laterally spaced substantially parallel rim elements, a plurality of brackets spaced inwardly from said rim elements adapted to receive means for connecting the traction unit to the tractor wheel, and a plurality of elongated members connecting each of the brackets to said rim elements, one of the members for each bracket being secured at its extremities to one of said rim elements and being connected at spaced points intermediate its ends to the associated bracket, others of said members for each bracket being respectively secured at their extremities to the other of said rim elements and being connected to said brackets in spaced relation to each other.

8. A demountable annular traction unit adapted to form the peripheral portion of a tractor wheel and to be used in place of a demountable rubber tire, said unit comprising laterally spaced substantially parallel rim elements, a plurality of brackets spaced inwardly from said rim elements adapted to receive means for connecting the traction unit to the tractor wheel, and a plurality of elongated members connecting each of said brackets to said rim elements, one of said members for each bracket being secured at their extremities to one of said rim elements and others of said members for each bracket being secured at their extremities to the other of said rim elements, each member of each rim element being overlappingly secured to two other of said members of the same rim element and to two others of said members of the other rim element.

WILLIAM E. WINE.